(12) United States Patent
Epstein

(10) Patent No.: US 10,818,076 B2
(45) Date of Patent: Oct. 27, 2020

(54) IMMERSIVE ENVIRONMENT FROM VIDEO

(71) Applicant: Aaron Bradley Epstein, Redwood City, CA (US)

(72) Inventor: Aaron Bradley Epstein, Redwood City, CA (US)

(*) Notice: Subject to any disclaimer, the term of this patent is extended or adjusted under 35 U.S.C. 154(b) by 147 days.

(21) Appl. No.: 16/172,023

(22) Filed: Oct. 26, 2018

(65) Prior Publication Data

US 2020/0134907 A1 Apr. 30, 2020

(51) Int. Cl.
*G06T 15/20* (2011.01)
*G06T 7/536* (2017.01)
*H04N 5/232* (2006.01)
*H04N 5/222* (2006.01)
*G06F 16/2457* (2019.01)

(52) U.S. Cl.
CPC ........ *G06T 15/20* (2013.01); *G06F 16/24578* (2019.01); *G06T 7/536* (2017.01); *H04N 5/2226* (2013.01); *H04N 5/23212* (2013.01)

(58) Field of Classification Search
CPC ....... G06T 15/20; G06T 7/536; G06T 15/205; G06F 16/24578; H04N 5/2226; H04N 5/23212
See application file for complete search history.

(56) References Cited

U.S. PATENT DOCUMENTS

| 5,850,352 A | * | 12/1998 | Moezzi | ............... | H04N 13/139 345/419 |
| 2018/0350146 A1 | * | 12/2018 | Gervasio | .............. | H04N 21/816 |
| 2019/0222823 A1 | * | 7/2019 | Clagg | .................. | H04N 13/194 |

* cited by examiner

*Primary Examiner* — Yon J Couso
(74) *Attorney, Agent, or Firm* — Myers Wolin, LLC

(57) ABSTRACT

Computer based methods are provided for displaying an image or video. The methods are usable for displaying a virtual space to a viewer of a video, where the video was originally generated using a virtual environment. For example, when a streamer streams gameplay of a video game that occurs in a virtual environment, the method allows such a video streamed to be presented to a third-party viewer, such as a stream viewer, as a virtual environment.

17 Claims, 8 Drawing Sheets

IMMERSIVE ENVIRONMENT FROM VIDEO

FIELD OF THE INVENTION

The invention relates to improved use of VR environments constructed from streaming video.

BACKGROUND

More and more computer users are becoming familiar with the level of immersion provided by roomscale virtual reality (VR). Most often, this immersion comes in the form of games or other virtual environments rendered locally on a user's own computer system. However, people want to share their experiences, and VR experiences are no exceptions. Such VR experiences may take the form of video games or other virtual environments. However, it is typically impossible for a third-party to immerse themselves in someone else's VR experience.

This is because when a first viewer, typically the party interacting with the original virtual environment, referred to herein as a streamer, experiences a VR environment, such as in the context of a video game, and broadcasts it by, for example, streaming the experience over the internet, what is actually broadcast is a video of the streamer's experience rather than the environment itself. Accordingly, any third-party viewer, referred to herein as a stream viewer or a user of the system described, is tied to whatever viewing perspective the streamer used.

This remains true as a streamer (i.e., a gamer) plays a game or otherwise travels through a VR environment. Any third-party sharing the experience is typically a passenger viewing whatever perspective the streamer experienced.

In broadcasting or otherwise streaming VR experiences directly, offering viewers some degree of freedom, there are limited formats that exist. The two primary options are 360 video and native VR experiences. Videos are typically content and source neutral, and there are many tools to edit them. They can be obtained from reality, CGI, or both.

However, such 3D videos are typically presented to stream viewers in flat and non-immersive ways. When viewed by a stream viewer streaming such a 3D viewer, the 2D environment appears as a flat screen surrounding the viewer. The viewer travels wherever the camera (whether it be a real camera in a real environment or a virtual camera in a 3D environment) travels. While a viewer may zoom in or out in such a video, there is no sense of scale, nor is there any ability to move within the environment. It is as if the stream viewer is in a room surrounded by flat screens.

Further, flat screen streaming has several additional deficiencies when one or both the streamer and the stream viewer are using a VR system. If the streamer is using VR, the stream viewer has to deal with erratic head movements and low field of view, as there is no way for the stream viewer to experience that environment.

In viewing 360 video, stream viewers cannot move their position within the recorded environment. Further, while extra cameras are inexpensive in real world environments, such as in sports broadcasts, rendering additional camera views for users presents a substantial performance load in VR systems already pushed to the limit in rendering a scene for the streamer or game player himself.

Further, viewers of streamed videos of first viewers, such as gamers, traveling within virtual environments has negative side effects, such as motion sickness, related to being forced along a path without control.

Accordingly, whether a stream viewer is viewing a 3D video or viewing a video from a streamer, or gamer, exploring a three-dimensional environment, there is a need to increase the immersiveness of the environment accessible by the third-party viewer, such that they are no longer limited to viewing, at best, a video display appearing around them in 360 degrees. There is a further need to allow a third-party viewer to move within the three-dimensional environment presented separate and apart from the movement of the primary camera or streamer while still presenting all content in the original video.

SUMMARY

Computer based methods are provided for displaying an image or video. The methods are usable for displaying a virtual space to a viewer of a video, where the video was originally generated using a virtual environment. For example, when a streamer streams gameplay of a video game that occurs in a virtual environment, the method allows such a video streamed to be presented to a third-party viewer, such as a stream viewer, as a virtual environment.

In one embodiment, the method comprises receiving a first image, generally a current frame of a video being viewed. The first image comprises a plurality of first image pixels, each of the first image pixels comprising three-dimensional location data locating the corresponding pixel in three-dimensional space. Three-dimensional scene data may then be generated from the first image pixels, the scene data comprising the first image pixels, wherein each first image pixel is located in the three-dimensional scene as a scene pixel at a location corresponding with its three-dimensional location data.

The method then evaluates one or more secondary image comprising a plurality of secondary image pixels, each of the secondary image pixels comprising three-dimensional location data locating the corresponding pixel in three-dimensional space. Pixels from such a secondary image may then be incorporated into the three-dimensional scene as scene pixels at locations corresponding with their three-dimensional location data.

Once pixels from the first image and the secondary images are incorporated into the scene space, the method prepares a scene view for display at a user interface device. Such a scene view is a view of the three-dimensional scene space from a perspective different than a perspective of the first image.

In the method described the one or more secondary image pixels are used to supplement the first image pixels where a pixel is located at a three-dimensional location not visible in the first perspective view but visible in the display view and also visible in a second perspective view of the corresponding secondary image.

Typically, the first image is a current frame of a video being streamed, such that the first image is the most recently received frame in the video stream.

The secondary image described may be one of several secondary images containing secondary image pixels usable by the method for incorporation into the three-dimensional scene. Such secondary images are typically previously received frames in the video being streamed and are stored in a database as relevant images to be drawn from, and they provide perspectives of a three-dimensional scene distinct from that provided by the first image.

In some embodiments, the pixels of the secondary images are compared to the scene space containing pixels of the first image in order to determine if such pixels should also be incorporated into the scene space. In such embodiments, the secondary image pixels may be incorporated into the scene space only if no scene pixel is already located at the relevant location in the scene.

The first image, as well as each of the secondary images, may be provided with a field of view and a resolution of a source of the first image. Further, the three-dimensional location data for the image pixels may be depth buffer data, and the three-dimensional location data may be converted to a scene location based on the field of view of the source of the first image and the position in frame of the corresponding pixel.

Similarly, the three-dimensional location data may comprise depth with respect to a camera angle.

In some embodiments, the location data for a pixel may comprise an absolute location of the corresponding pixel located within the three-dimensional scene, rather than a location defined relative to the camera angle of the image. In other embodiments, each image has pixels with locations defined in terms of the particular frame, such that the pixel location data must be converted to a location in the context of the scene space.

Once a display view of the scene space is presented to a user, the user can then navigate around the virtual space represented using a user interface device. Accordingly, if the user moves within the scene space, the display view is rendered again based on the newly defined display view based on the pixels defined in the scene space.

In addition to changing the display view based on pixels defined in the scene space, the scene space itself is updated when an updated image is received, such as a new frame received in the video stream.

Accordingly, when a new image is received, the method is redone, using the new image instead of the first image. Accordingly, secondary images are once again evaluated to determine which pixels are to be displayed, and the scene space is then updated and presented to a user. Further, the method determines whether the first image should be saved and, for example, incorporated into further iterations as one of the secondary images.

Evaluating whether the secondary image is to be replaced with the first image may be based on a similarity coefficient comparing the existing secondary images to the first image.

In such a way, the method determines if the first image is more valuable to the method than the least valuable of the secondary images in the database. If so, the least valuable of the secondary images may be deleted, and the first image may be stored in its place.

Determining the value of the secondary images may be by comparing each secondary image to all other secondary images and determining similarity quotient for each. Figures that are more similar to existing figures are ultimately less valuable to the method. Accordingly, figures that are least similar to each other are ranked highest by such a metric. Once the least valuable secondary image is determined, such a metric can be compared to the first image to determine if such image should be stored or discarded.

DETAILED DESCRIPTION OF THE PREFERRED EMBODIMENTS

Figure 1:
FIG. 1 shows a current frame received by a video viewer of the current disclosure.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

The success of video game and video streaming services show that users wish to share experiences with others, and that third parties enjoy sharing experiences with primary viewers and gamers.

As described in more detail below, this disclosure provides systems and methods for reconstructing a virtual environment seen by a video streamer on a stream viewer's machine as a way for a third-party stream viewer to enjoy an immersive experience rendered on their own computer system recreated from a streamed video of a streamer's VR experience.

To reconstruct an environment rather than just a 2D projection of it, the color data of a video frame may be augmented by world position data. With each pixel located in space, the stream viewer can move around with six degrees of freedom and always see a geometrically accurate world. In the same way that video frames provide color snapshots, each video frame in this new system and method is a spatial snapshot, combining the color snapshots with position data for portions of the image, and together those snapshots capture a portion of the world. Since the stream viewers have a geometric representation of the world, they can move around and focus at their leisure, seeing the world form and change around them as the streamer plays.

FIG. 1 shows a current frame received by a video viewer at a stream viewer's viewer interface device of the current disclosure. As shown the video frame is from a first perspective view of a three-dimensional scene, in this case a cemetery. When viewing a streaming video in a traditional system, the user would be limited to this particular perspective view. If the streaming video were a 360 degree video, a stream viewer would be able to rotate in place, but would be unable to move from the camera location. Accordingly, while the viewer can clearly see the mausoleum shown in the foreground, a viewer cannot see anything behind the object shown.

Figure 2:
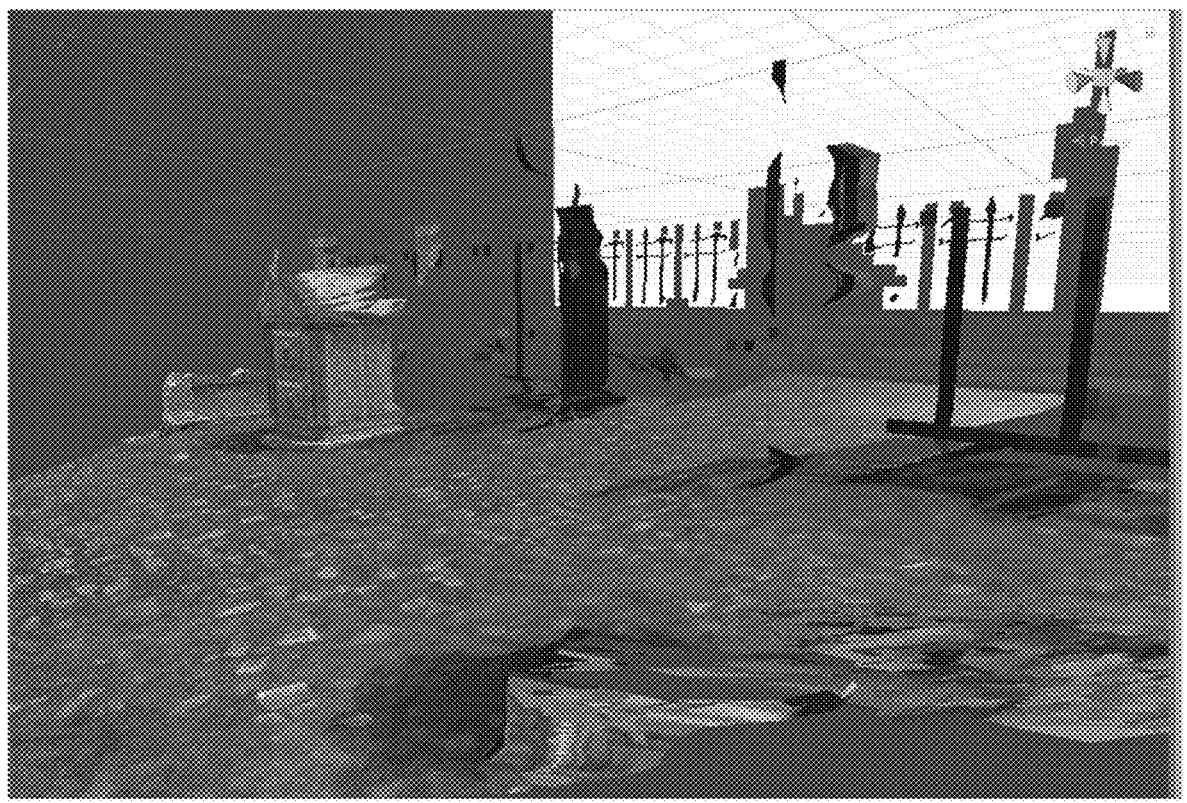
FIG. 2 shows a display view recreated from the current frame of FIG. 1.

However, in the present system, a stream viewer may view the same content from a second perspective, referred to herein as a display view. FIG. 2 shows a display view recreated from the current frame of FIG. 1 from a different perspective than the first perspective view. As shown, the scene as recreated only from FIG. 1 contains gaps at locations that were not visible from the perspective of FIG. 1. Accordingly, any content that was hidden by the mausoleum shown in FIG. 1 is simply missing in FIG. 2. For this reason, the front façade of the mausoleum may be viewable, but without any depth, and any side walls and objects blocked in the first view are simply missing.

Figure 3A:
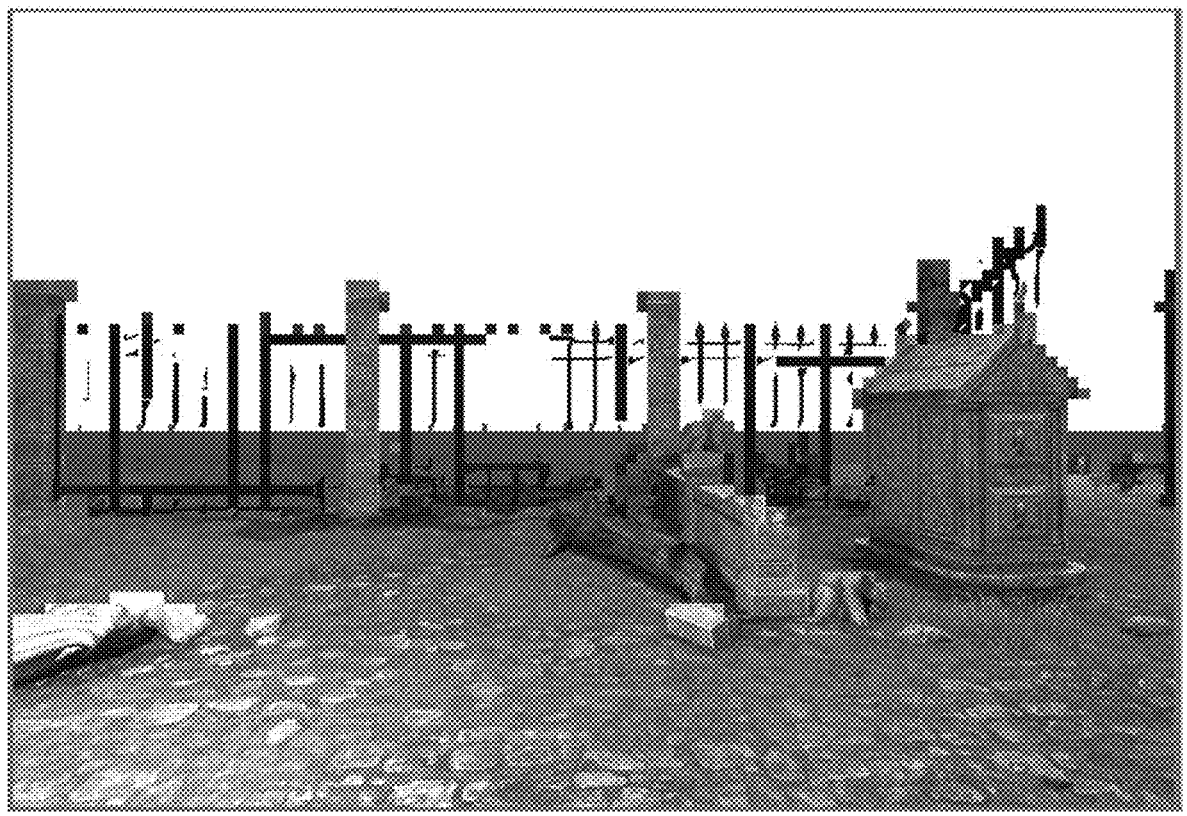
FIGS. 3A and 3B show secondary frames received by the video viewer prior to receipt of the current frame.
Figure 3B:

FIGS. 3A and 3B show secondary frames received by the video viewer prior to receipt of the current frame. The secondary frames show the same scene from a second perspective view different than the first and, typically, different than the display view. Such secondary frames are generated while the video streamer moves around the virtual environment before arriving at the view in the current frame. The secondary frames were received by the video viewer earlier in the video stream and were stored as a relevant frame that can contribute information to the rebuilding of a scene. In the example shown, the scene being viewed is a cemetery shown with a mausoleum in the foreground. As the primary viewer approached the mausoleum in their transmitted video, various objects next to and behind the mausoleum may have appeared and disappeared from view based on viewing angles. Similarly, side walls and surface texture not visible in the current frame may have been previously visible. Accordingly, the secondary frame is a second perspective on the same scene as the current frame, but shows at least some content not visible in the current frame and was therefore determined to be valuable by the system described.

Figure 4:
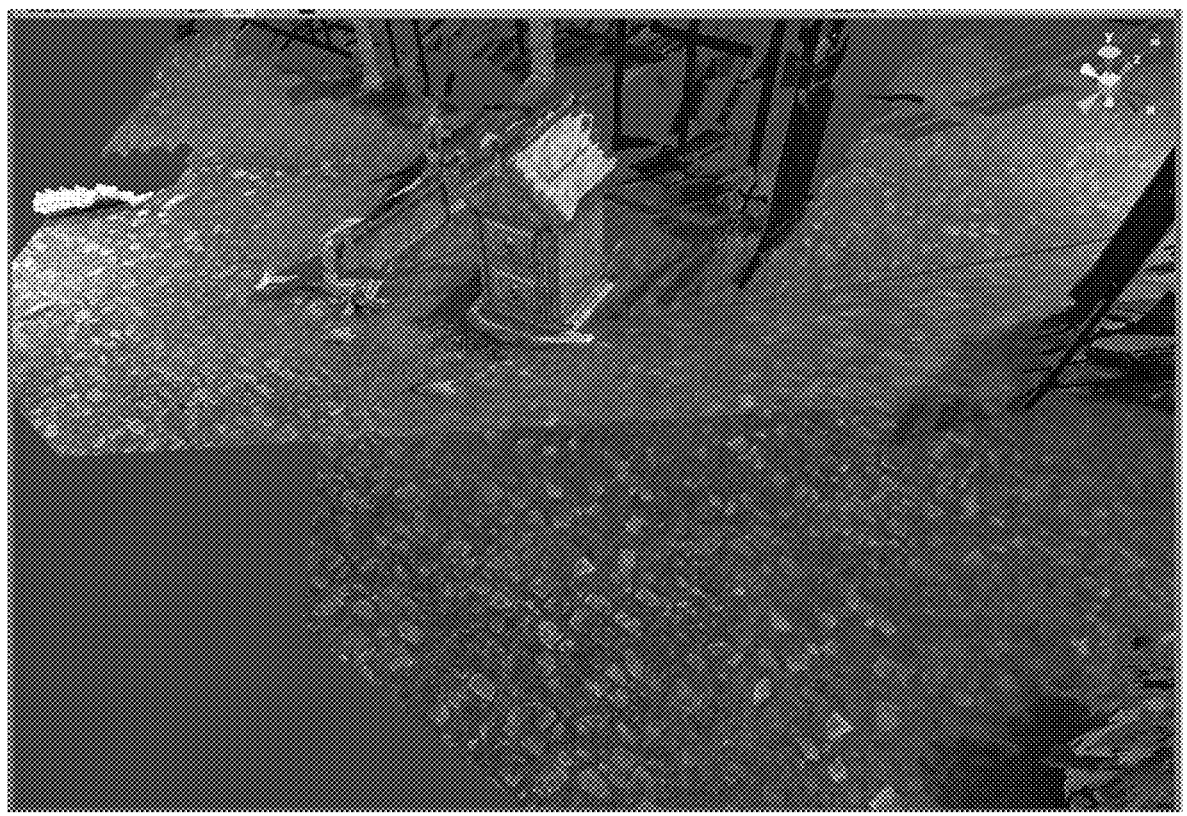
FIG. 4 shows the display view of FIG. 2 further incorporating at least one secondary frame.

FIG. 4 shows the display view of FIG. 2 further incorporating the secondary frames. As shown, all pixels extracted from the current frame remain in view, while gaps in the content of the frame, such as locations within the scene that were blocked from view by the mausoleum, are now filled in with pixels, or groupings of pixels, from the secondary frame.

Figure 5:
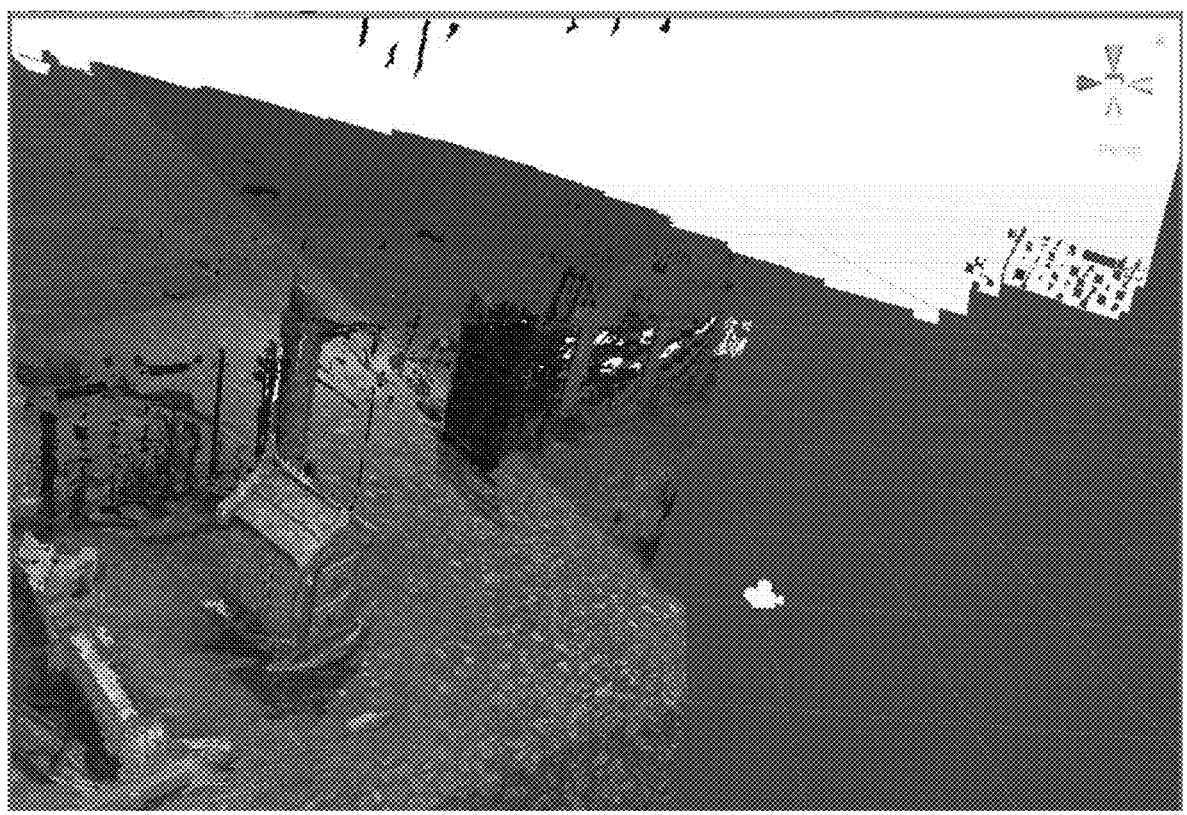
FIG. 5 shows a display view incorporating a plurality of secondary frames.

In this way, additional secondary frames may be used to fill in content missing from the current frame as a user travels through the scene, in this case a cemetery, separate from the primary viewer. FIG. 5 shows a new display view taken from a different perspective incorporating many secondary frames. As shown, the display view may include an icon showing the location and camera angle of the video streamer, and the portion of the display visible in the current frame may be shown in a somewhat distinct way. In the example shown, the content visible in the current frame is shown in slightly lighter color than the rest of the frame.

Additional details for how the secondary frames, or images, are used to fill in gaps in the scene, as well as descriptions of systems for implementing the methods described, are provided below.

Figure 6:
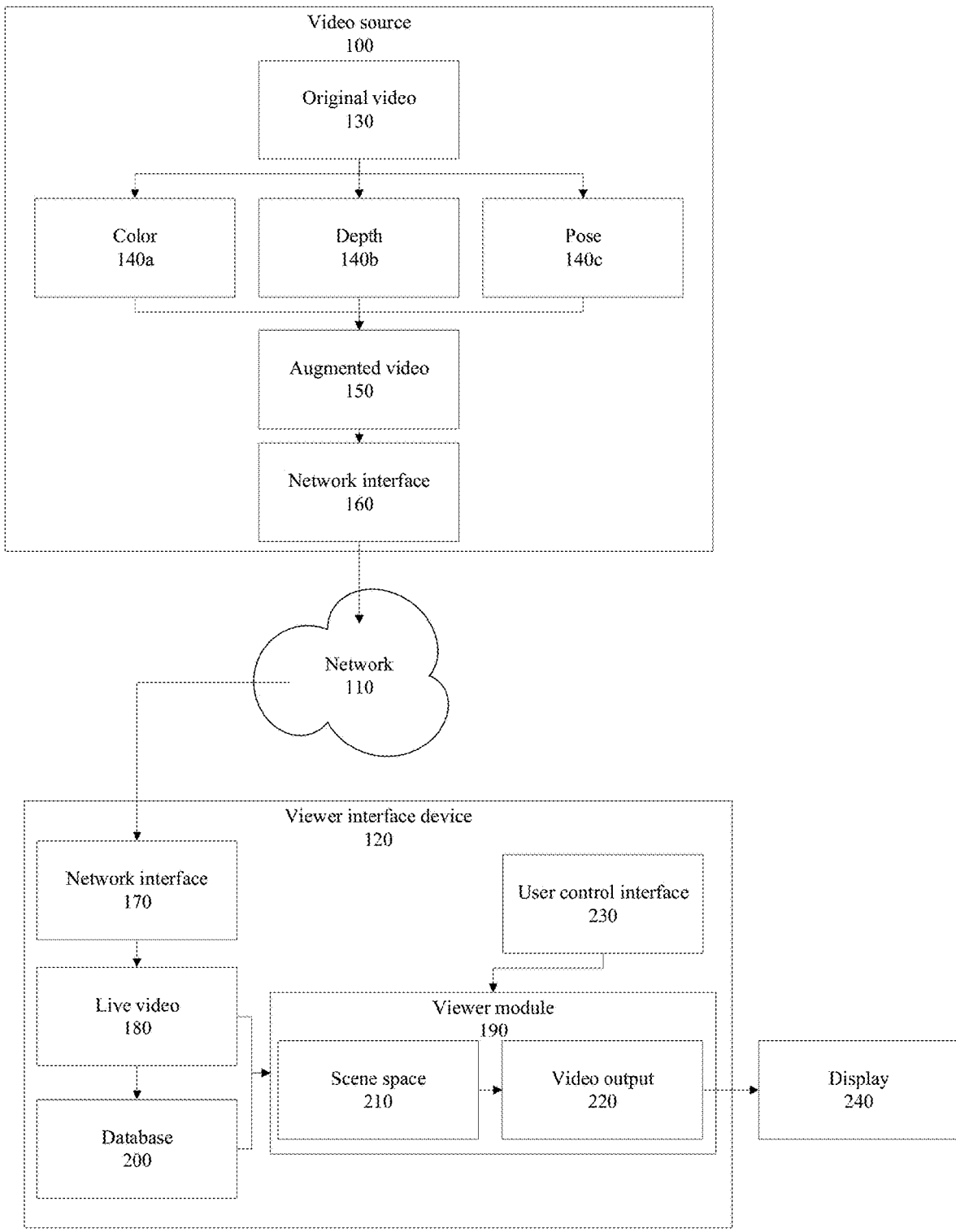
FIG. 6 is a schematic diagram of a system for displaying the display views of FIGS. 4 and 5.

FIG. 6 is a schematic diagram of a system for displaying the display views of FIGS. 4 and 5. As shown, the system generally comprises a video source 100 transmitting, or streaming, content to a network 110, and a viewer interface device 120 for receiving that content. The video source 100 is typically a computer system used by a video streamer, such as a gamer's system. The viewer interface device 120 is typically a computer system used by a stream viewer, referred to occasionally herein as a user of the system. The network 110 described herein can be any network, but is typically the internet. Further, such a network transmission need not be live or provided in real time. In some embodiments, the video source 100 may write to a file and the viewer interface device 120 can then read that file.

As shown, an original video 130 is produced at the video source 100. This video 130 is whatever video is ultimately to be streamed, and it may be, for example, the video output of a video game being played by the video streamer. Prior to transmitting the original video 130, such a video is converted to augmented video 150 by supplementing data typical of a video frame with additional data. In this context, each pixel, or grouping of pixels, of the original video is provided with a color 140a and a location indication, such as depth 140b, and pose 140c of a physical or virtual camera that generates the original video 130. While the system is described in terms of adding such detail to frames of video content, it will be understood that the video may be produced as an augmented video. Similarly, while the location indication is described in terms of depth 140b and pose 140c, such location indication may be incorporated differently, such as with universal coordinates. Accordingly, the particular format of the video frames are not critical, so long as the video and data for locating pixels of the video (in this case, depth and pose information) are provided together such that each frame's data can be associated with the pixels of that frame.

The augmenting of the original video 130 with additional data can be by extracting depth data from images. It can be based on camera details (or details of a virtual camera in a virtual environment). Some techniques for this are discussed in more detail below.

Once the augmented video 150 is prepared, a video source network interface 160 transmits the video by way of the network 110 so that it can be retrieved and streamed at the viewer interface device 120 by way of a second network interface device 170.

The viewer interface device 120 receives the augmented video 150 and processes it as live video 180, as described below. The viewer interface device provides a viewer module 190 for displaying a scene to a viewer and a database 200 for storing data from the augmented video 150 useful for implementing the method, such as various secondary frames from earlier in the live video stream 180. The viewer module 190 includes a scene space 210 for assembling a scene for viewing at a video output 220 from the live video 180 and data stored in the database 150.

The video output discussed here may simply be an output of parameters for a video provided to a GPU for rendering the scene to a user of the system described. Accordingly, it may be parameters applied to the scene space that provide a complete description needed by the GPU to generate and output an image to a display.

The viewer module 190 assembles a scene for display based on user inputs which control a user's location within a scene and perspective on the scene. Such inputs are retrieved from a user control interface 230. Accordingly, as a user uses the user control interface 230 to walk around a virtual space derived from an augmented video stream, the viewer module 190 constantly assembles and updates a scene space 210 based on a current frame from the live video stream 180 and at least one secondary image drawn from the database 200. The GPU, provided data at the video output 220, may then output the video to a display 240.

It is noted that various components and modules for implementing the method described can be moved between the viewer interface device 120 and the video source 100. For example, the video source 100 may stream a traditional original video 130 as output and the viewer interface device 120 may transform the video to augmented video 150 prior to further processing. Alternatively, a third-party may retrieve the original video 130 from the network 110 and transform it to an augmented video 150 prior to retransmitting it to the network 110. This may be, for example, by way of a cloud service. In this way, older videos may be transformed and augmented after the fact.

Further, while the original video 130 is described as being converted to an augmented video 150 in real time, it may be done after an original streaming session or prior to transmitting by way of the network 110 without changing the display methods described herein.

In order to better transform the current frame, occasionally referred to herein as a first image, into the three-dimensional scene, additional details from the first image may be leveraged. For example, the first image may further comprise metadata describing a field of view and resolution of a source of the first image. Accordingly, the three-dimensional location data for the first image pixels may be depth buffer data, and the three-dimensional location data may be converted to a scene location based on the field of view of the source of the first image, taken in the form of angular size and pixel density of the frame, and the position in frame of the corresponding pixel. Similarly, the three-dimensional location data may comprise depth with respect to a camera angle, and the three-dimensional location data may be extracted from a depth map of the first image.

Accordingly, the three-dimensional location data for the first image may be provided in terms of the context of the first image, while the three-dimensional location data for secondary images may be in terms of their own respective contexts. Accordingly, the three-dimensional data may require conversion for use in the scene space 210, as described below.

In some alternative embodiments, some metadata may be provided for the video as a whole, rather than for individual frames.

Figure 7:
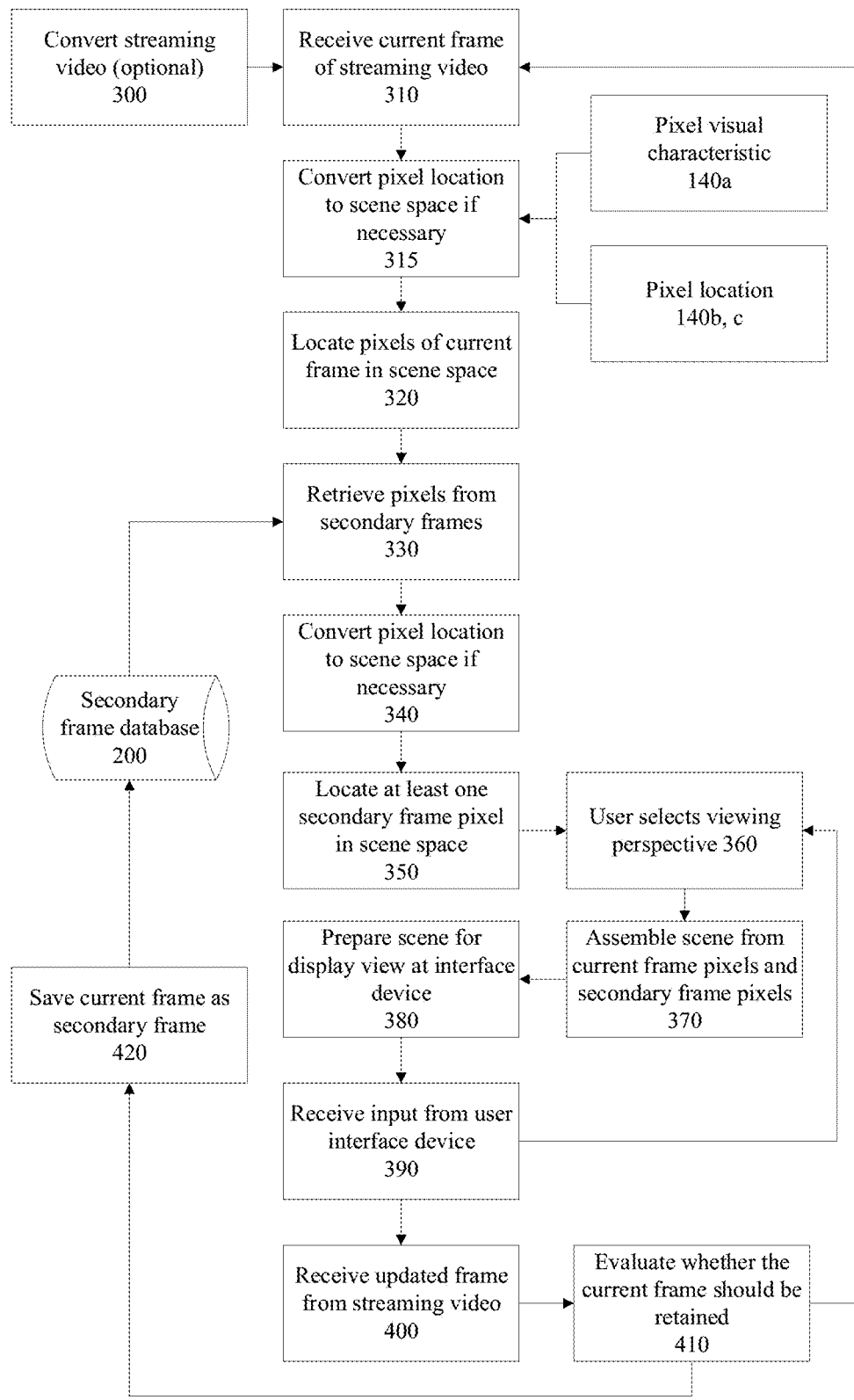
FIG. 7 is a flow chart illustrating a method for displaying the display view of FIGS. 4 and 5.

FIG. 7 is a flow chart illustrating a computer-based method for displaying the display views of FIGS. 4 and 5.

As an initial step, as discussed above, a traditional original video may be converted (300) to an augmented video 150. This conversion may take place either at a video source 100 prior to transmitting to a network 110, at a viewer interface device 130 after receiving a video, or at a third-party service, such as a cloud-based video conversion service.

It is noted that the method, as described, is an ongoing method. Accordingly, while the method is described in terms of a current video frame, or a first image, and one or more secondary frames or images, the current frame represents the most recently received or processed frame, while secondary frames are typically previously received frames and had, at a previous time, been the "current frame." Further, the method described may provide poor results early in a video streaming event, as the database 200 described may not yet be populated with sufficient secondary frames to supplement the current frame.

After the video is converted (at 300), a current frame of the streaming video is received (310). The current frame contains a pixel visual characteristic, such as a color or texture 140a, as well as pixel location data, such as depth 140b and pose 140c relative to the camera. The pixel location data 140a, b may take several forms, but it is sufficient for locating the corresponding pixel in three-dimensional space.

Accordingly, while a typical pixel would be defined by its color and location within an image or video frame, the enhanced pixels of augmented video include at least some additional data for defining the pixel location in three-dimensional space. On a per frame basis, this data includes the camera's position in space and direction of focus. Standard methods for representing the direction the camera is pointing are use of a quaternion, a triplet of angles (yaw, pitch, roll), a transformation matrix, or a pair of vectors representing the forward and up directions relative to the camera. These variables are typically the same for every pixel in the individual frame. At the pixel level, each pixel is given one value that describes its displacement from the camera. Standard ways to represent this are Euclidean distance, z distance (length of vector along only the camera's forward direction), and to some extent stereo disparity. Any of these options can be leveraged by the methods described herein, requiring only simple adjustments to the math.

It is noted that while the method is discussed in terms of pixels, the method may be adapted to rely on groupings of pixels in order to reduce the geometric resolution and therefore the processing load of the method. Accordingly, a frame may comprise separate color images and depth images with different resolutions, such that groupings of pixels in the color image have depths in the depth image.

The pixel locations for pixels in the current scene are then converted (315) to a three-dimensional location in some scene space 210 representing a current scene to be displayed to a stream viewer. This conversion may convert the pixel location from a coordinate system or other description tied to a perspective of the current frame, such as a perspective based on a virtual camera, to a more general or consistent representation of the location of the pixel within the scene space 210.

In some embodiments, the pixel location definitions of the augmented video are already in terms of general coordinates, in which case the conversion described may be unnecessary. Accordingly, once the current frame is received (at 310), pixels of the current frame, or first image, are located in three-dimensional scene space (320). In this way, three-dimensional scene data is generated comprising the first image pixels, wherein each first image pixel is located in the three-dimensional scene as a scene pixel at a location corresponding with its three-dimensional data.

At least one secondary frame is then evaluated to determine if the secondary frame is likely to contribute content missing from the current frame, such as visual content blocked from view by objects in the current frame. Alternatively, the pixels may be compared directly, such that pixels from a secondary frame are used by the method if no pixels from the current frame exist at the same location in the scene being constructed in the scene space 320. This may be done prior to a current iteration of the method, as the secondary frames available from the database 200 may be frames already determined to be relevant. The secondary frames in the database 200 may be a plurality of frames made available to the method for constructing a scene for viewing. It will be understood that while frames and images are technically distinct, in that a frame may comprise multiple images (i.e., a separate color image and depth image), the terms are occasionally used interchangeably herein. In certain contexts, where the distinction is relevant, such a distinction is clarified in the text.

However, generally, the augmented video 150 discussed herein is made up of augmented frames comprising pixels (such as in the form of a color image) and location context (such as in the form of a depth image). Similarly, when an "image" is mentioned in the context of an augmented video 150, such an image may be made up of both pixels and location context.

Pixels are then retrieved from secondary frames (330) from the database 200 to supplement the pixels of the current frame as necessary. As in the case of the current frame, the secondary frames are augmented with visual characteristics and three-dimensional locations. If necessary, the pixel locations of pixels from the secondary frames are converted to the general coordinates discussed above (at 340), and at least one secondary frame pixel is incorporated into the scene space (350) with the pixels from the current frame.

A stream viewer, or user, may then select a viewing perspective (360) at the user control interface 230 of the viewing interface device 120. In such a way, the user may choose to view the scene space from a perspective different than that of the current frame, namely a display view. Alternatively, the method may assume that a stream viewer has remained at a previously selected location and is viewing the scene from the same perspective. The viewing module then prepares for display a display view of the three-dimensional scene, wherein the first image, or current frame, is a first perspective view of the three-dimensional scene, and wherein the display view is a second perspective view of the three-dimensional scene different than the first perspective view. In this way, the method assembles the scene (370) from the current frame pixels and the secondary frame pixels and outputs to a graphics driver (380), thereby presenting the scene to the user at a display 240.

After the user is able to view the scene from the display view, the user may interact further with the viewing interface device 120 by way of the user control interface 230. In this way, the method receives user input (390) defining a new display view. If so, the method returns to such a user selection (at 360) and reassembles the scene at the space 210. If no new current frame has been provided, no update to the scene space 210 may be necessary, and a new display view may be prepared directly at the video output 220 and output to the display 240.

Further, as time passes, the method receives updated images (400) as "current frames" from the live video 180. At that time, the system may determine whether the existing current frame should be retained (410) and then return to earlier in the method such that pixels from the newly received current frame can be converted, if necessary (at 315) and incorporated into the scene space (at 320).

If the method determines that the current frame should be retained (410), the current image is saved to the database 200 as a secondary image (420), and is made available to the method as one of several secondary images.

In some embodiments, the determination of whether the current frame should be saved as a secondary image is based on a similarity coefficient for comparing existing secondary images to the current frame or first image. Ideally, the secondary images all show different content, and therefore provide more distinct content for the scene space 210 to draw from. Accordingly, ranking higher under the described similarity coefficient means that the images are more dissimilar and have a lower similarity coefficient.

All secondary frames retained in the database 200 may be ranked according to a similarity coefficient. If the current frame ranks higher than any of the existing secondary frames, meaning it is less similar to existing secondary frames, the current frame may be saved to the database 200 as a secondary frame and the lowest ranked secondary frame may be deleted.

In the method described, the database 200 typically holds a constant, or maximum, number of frames, and the stream sends dozens of frames every second. The secondary frames held in the database 200 contain the data available to the viewer module 190 for constructing the scene in the scene space 210. Accordingly, the viewer module 190 must cull incoming frames in order to distribute frames (and pixel data) efficiently across an environment available for modeling. For this reason, the viewer module 190 typically chooses the least useful frames for replacement when a new frame is received and added to the set of available secondary frames.

Accordingly, each frame may be related to each other frame by a similarity coefficient. Such a calculation measures how much of one frames section of the environment is covered by the other. Accordingly, frames with lower similarity coefficients are preferred, since they provide more data not available from other available frames.

In steady state, the database would have many frames that cover sections of the environment, overlapping somewhat, and thereby providing views of large portions of the relevant environment. If the streamer is, for example, walking slowly through the environment, the current frame would align closely with a recently created secondary frame, and it would therefore have a high similarity coefficient with that frame, or with some other frame already stored.

However, if the streamer moves into a new position, the similarity coefficient would decrease. Once the current frame and the existing secondary frames are distinct enough such that the current frame is worth retaining, an older and closer snapshot secondary frame is culled such that the memory can be reused for the current frame.

One implementation of the calculation of a similarity coefficient is described as follows. Two identical frames have a coefficient of one, while two frames, occasionally referred to as tophs, with no overlap in information have a coefficient of zero. While the overlap between regions covered by renders is complex, it can be approximated with two simple factors. The first factor is the similarity of the look angles, calculated by the dot product of the forward looking direction of the two tophs. The other factor is the similarity in position. The streamer specifies a distance, called the focus distance, which approximates the average distance between the camera and something interesting on the screen. The similarity in position between two tophs is distance between the points focus distance in front of them divided by the focus distance value. The product of the two factors is the similarity.

In some embodiments, additional mechanisms may be provided for aging out frames stored as secondary frames even if they are not overly similar to other frames. This is because without another mechanism for culling secondary frames, the similarity culling system described would eventually produce the maximum number of frames with absolutely zero relation. At that point, the system can only choose the oldest possible frame once the current frame also has zero overlap. While this situation isn't a disaster, the fact that the viewer can't possibly enjoy dozens of frames with zero overlap means that this allocation is wasting resources and potentially skipping useful content.

Accordingly, frames can be marked for reuse once they reach a certain age, representing their lifespan, thereby preventing the allocation of frame resources to areas in the distant past. Although the lifespan has an initial value, if the toph similarity matrix is all zeros, then the visualizer may decide that the frames are surviving too long, and reduces the lifespan. By reducing the lifespan, the frames are more likely to be able to cover the entire observed environment.

In some implementations, such as with specific types of video data, the shortened life may become one frame, and a new snapshot would then be created every frame. While this may be an error requiring an alternative similarity calculation, with some games, like a racing game where each previous environment is quickly abandoned, creating a new snapshot every frame may simply be correct.

Additional details are provided for specific implementations of the system and method described herein. In order to better prepare a video source for use in the methods described, a primary viewer, or streamer, may set up some parameters with control messages. At a high level, these may be the properties of the camera capturing video in the game being played. To model a camera, the system must typically know the field of view (FOV) and resolution of the camera. If these change, more control messages may provide new values on a frame by frame basis.

The streamer may send the camera pose as a quaternion and 3 vector for every frame. Additionally, if the units of the depth buffer aren't in meters, then the streamer may provide a scaling factor. As discussed below, the scene space should correctly scale the frames for VR use.

With parameters specified, the data flow may consist of color and depth buffers. The color buffer looks like any other color data from any video stream. A significant difference is that unlike a standard gamer's stream, this color buffer should be separated from any additional stream decorations like webcam footage and donation notifications. This color buffer should hold the exact camera output. The depth buffer holds the distance from the camera to the fragment represented in the color buffer. To spare the viewer the pain of dealing with the streamer's projection matrix, the depth buffer may represent actual distance in linear units. The lexip section describes how depth, position in frame, and field of view are enough to place the fragment in the environment. The data of the color and depth buffer comprise the vast bulk of network transfers, so they would typically be compressed. In addition to the data necessary to construct the environment in the visualizer, some other miscellaneous data completes the stream. For example, stereo audio transmitted by the streamer can be rotated and played on the visualizer. Also, the streamer can provide the overlays they usually place on the video as a separate channel which can be reapplied by the viewer.

The data from the color and depth buffers come from the network and are typically decompressed at the viewer interface device 120.

Since the GPU is both the best place to decompress the data and the ultimate consumer of the data, the visualizer's CPU can transfer the compressed buffers to the GPU and never retrieve them again.

Since the color and depth buffers define all of the changes in geometry, the renderer need only transfer the camera model and other rendering parameters to the vertex shader. All such parameters are uniforms consuming negligible bandwidth. Per vertex mesh data like vertex position and UV do not change, as the vertex shader needs to recalculate their values anyway.

Accordingly, given the field of view, position in image, and distance from camera, the viewing module can calculate the exact scene space location for any pixel, or group of pixels. For example, if a screen is placed with its center on the Z axis at a specific distance, each pixel's position on the screen and the scene are identical, with the distance being ImageWidge/2/tan(fov/2).

The factors of ½ represent that the image center is at 0 rather than the corner. To calculate the direction from the camera, the shader normalizes the position on the sheet and by multiplying the distance and direction, the visualizer has an accurate model of where to locate the pixel in the scene space.

Instead of working directly with pixels, the method described may work with modified pixels, referred to herein as "lexips." Such a lexip gets four vertices to work with, representing its square nature. While one UV coordinate is enough to identify the pixel that this lexip corresponds to, a second may be required to identify which corner of the quad this vertex represents. The second UV is the UV of the pixel on the other side of the corner. In the case of a smooth surface, the edges of each lexip in worldspace typically will line up. Therefore, the calculation of each vertex position may consider all four pixels bordering the corner equally important and average them. If the lexips did not connect, the breaks in continuity would shatter the illusion that they represent a mesh rather than colored rectangles floating in the sky.

On some viewer systems, it may be necessary to create lexips at a lower quantity than the available pixels in order to conserve computing resources. In this case, the lexip covers multiple pixels, some of which might belong to disjoint surfaces. The vertex shader thus detects whether all four corners of the lexip have a similar distance to the camera, within a threshold ratio, and only adds in the depths that are within the threshold. If all four corners connect, then each of those vertices will have the same position and UVs. However, if even one doesn't connect, then the corner is considered broken, which may have ramifications in different aspects of the implementation described.

The video source may produce pixels at "infinite distance." For these pixels, the depth buffer will hold a special value. During the rendering process, these pixels will be affected by camera rotations, but not translations.

In the case of a connected corner, the color UV passed to the shader is exactly the UV of the corner, which is the average of UV1 and UV2 described above. For a broken corner, the UV is just UV1, which is the center of the value.

Once positioned in space, the lexips are typically shaded by sampling the associated colors associated with the UVs specified by the vertex shader.

The enhanced video is made up enhanced frames or images, as discussed above. These enhanced images are discussed herein as "tophs." Each toph has to store all lexips for a frame, as well as the data necessary to locate each lexip in the scene space and render it. The toph itself is a GameObject whose own position and rotation store the pose of the camera when the toph was taken. That way, the vertex shader for the toph will receive everything it needs to transform to worldspace, or the scene space discussed above, in the model and view matrices. Since there is one color and depth pair per toph, the toph stores references to them. Note, the references are to RenderTexture objects, which are only names, since the actual data in the textures are stored in the GPU. In addition, all meshes comprising the toph typically share one material which receives the textures and other parameters. One such parameter is the creation time, from which the shader can calculate the toph's remaining life time.

The mesh for the toph can have as many vertices as there are pixels in the image, but for performance reasons it may have fewer. A lower resolution only affects the geometry, so while the shapes projected onto the environment will be less precise, the color texture will still be represented at max resolution (except at surface borders, described above). The vertex shader only requires that the uvs be correct for each vertex and that they span the image, however, as an optimization additional data may be precomputed into the vertices. Since there is a limit to the number of vertices that can be stored in a single mesh in some game engines, such as Unity, a real limit which comes from the hardware, the meshes for the toph should be split. Based on the current limit, each split mesh represents a 64×64 section of the original image. In summary, a typical toph during testing represents a 1024×1024 image with a 4×4 grid of 64×64 split meshes, resulting in the geometry being downsampled to 256×256 total quads. These subtophs are transformed together and seamlessly combine visually.

One such toph typically represents the current frame or first image discussed above. The current frame is typically the most recently received frame of a video stream, and contains all the information that a flat image would along with the additional geometry data discussed above.

When the viewing module determines that a new image should be presented to the user, it chooses a new live toph, or the current frame. As discussed above, the previous live frame, or toph, may be saved as a secondary frame or image.

In some embodiments, older frames, including the secondary frames, may be visually modified to show that they represent older data. For example, the lexips from those tophs may be desaturated, tinted, or otherwise modified such that the viewer can distinguish the current scene from elements of the scene that may no longer be accurate.

In some embodiments, the database 190 may hold a constant number of secondary frames as available "tophs" at startup. Such secondary frames can be reused at any time, and all are typically reiterated for each frame as the scene is prepared for display. The pool of usable frames may therefore be stored in an array for easy and simple access.

Since the scene is made up of multiple overlapping frames, each of which was captured at a different time, the scene may capture multiple versions of objects within view, which may be lit or positioned differently. Ideally, only one version of an object would exist, but because a scene is typically dynamic and previous frames are the only available source of content to fill scenes with, such objects should be addressed. The current frame is always up to date by definition. Therefore, if earlier frames contradict the current frame, redundant fragments can be eliminated from the scene. Accordingly, if there are any fragments closer to the camera than the contents of the current frame, they can be eliminated such that the viewer's view of what the streamer is looking at is always clear of artifacts.

In implementing the methods described above, a variety of control schemes may be implemented for controlling the location of the user, or third-party viewer, and for dealing with movement of the streamer. Typically, if the streamer moves a significant distance within the virtual world, the viewer must follow. The way that such locomotion is handled may depend heavily on the game, streaming hardware, and viewing hardware.

A variety of schemes may be implemented for various game types. For example, in the case of rapid continuous movement by a streamer, the platform may move the viewer along with the streamer. However, this approach may create motion sickness, so the platform may provide a cockpit to mitigate such issues. Alternatively, in the case of a streamer standing still, such issues do not exist.

One complicated scenario is a game that involves occasional teleportation, in which a viewer may be teleported when a streamer does or, the viewer may remain in the previous scene briefly while the database 190 is populated with secondary frames for the streamer's new locale.

In the embodiment described above, the "current frame" or the most recently received image is given special status, and the pixels, or lexips, generated from that image are shown, assuming a user is looking in the direction of those pixels. It will be understood that this can be modified such that, for example, only one of every few frames is processed, and the current frame evaluated by the system is really the most recently received frame that is processed. Various other implementations are contemplated, many of which would be tailored to conserve processing power.

The method is generally described in terms of a streamer streaming the output of their interactions within a virtual environment such that the virtual environment can be recreated for a stream viewer. However, it will be understood that the methods can be applied to a wide variety of videos, such that any such video can be transformed into a virtual environment for a third-party viewer.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

The embodiments of the invention disclosed herein may comprise a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device may receive computer readable program instructions from the network and forward the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, Java, Perl, Python or the like, and conventional procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and/or computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A processor or processor circuitry may include a device that has any combination of hardware, circuitry, and software. The hardware and circuitry examples may comprise a parallel processor, a processor array, a vector processor, a scalar processor, a multi-processor, a microprocessor, a communication processor, a network processor, a logic circuit, a queue management device, a central processing unit (CPU), a microprocessing unit (MPU), system on a chip (SoC), a digital signal processor (DSP), an integrated circuit (IC), an application specific integrated circuit (ASIC), a programmable logic device (PLD), and a field programmable gate array (FPGA). A processor or processor circuitry may include one or more processors, one or more circuits and/or software, that responds to and processes basic computer instructions and carries out the instructions of a computer program by performing the basic arithmetic, logical, control and input/output (I/O) operations specified by the instructions, one or more of: an arithmetic logic unit (ALU), which may carry out arithmetic and logic operations on the operands in instructions; a floating point unit (FPU), also known as a math coprocessor or numeric coprocessor, which is a specialized coprocessor that may manipulate numbers more quickly than the basic microprocessor circuitry can in some cases; one or more registers, which may hold instructions and other data and supply operands to the ALU and store the results of operations; and cache memory, which may save time compared to having to get data from random access memory (RAM). A processor or processor circuitry may also include one or more circuits comprising electronic components, such as resistors, memristors, power sources, magnetic devices, motors, generators, solenoids, microphones, speakers, transistors, capacitors, inductors, diodes, semiconductors, switches, antennas, transducers, sensors, detectors, vacuums, tubes, amplifiers, radio receivers, crystals, and oscillators connected by conductive wires or traces through which electric current can flow. The combination of components and wires may allow various simple and complex operations to be performed: signals may be amplified, computations can be performed, and data can be moved from one place to another.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A computer based method for displaying an image or video comprising:
   receiving a first image comprising a plurality of first image pixels, each of the first image pixels being provided with corresponding three-dimensional location data locating the corresponding pixel in three-dimensional space;
   generating three-dimensional scene data comprising the first image pixels, wherein each first image pixel is located in the three-dimensional scene as a scene pixel at a location corresponding to its three-dimensional location data;
   evaluating one or more secondary image comprising a plurality of secondary image pixels, each of the secondary image pixels being provided with corresponding three-dimensional location data locating the corresponding pixel in three-dimensional space;
   incorporating one or more secondary image pixel into the three-dimensional scene as a scene pixel at a location corresponding with its three-dimensional location data; and
   preparing for display at a user interface device a display view of the three-dimensional scene, wherein the first image is a first perspective view of the three-dimensional scene, and wherein the display view is a second perspective view of the three-dimensional scene different than the first,
   wherein one or more of the one or more secondary image pixels is visible in the display view where the pixel is located at a three-dimensional location not visible in the first perspective view,
   wherein the secondary image is image is stored in a database as a relevant image to be drawn on for three-dimensional pixels, and wherein the method further comprises:
   receiving an updated image comprising a plurality of updated image pixels after preparing the three-dimensional scene for display at the user interface device, each of the updated image pixels being provided with three-dimensional location data locating the corresponding pixel in three-dimensional space;
   incorporating each of the updated image pixels into the three-dimensional scene as scene pixels;
   evaluating whether any secondary image from a plurality of secondary images is to be replaced or supplemented with the first image;
   if so, updating the stored secondary image to correspond to the first image; and
   incorporating at least one secondary image pixel into the three-dimensional scene as a scene pixel at a location corresponding with its three-dimensional location data, and
   preparing for display at the user interface device an updated display view of the three-dimensional scene.

2. The computer based method of claim 1, wherein the first image is a most recently received image in a frame of a video stream.

3. The computer based method of claim 2, wherein the secondary image is one of several secondary images containing secondary image pixels incorporated into the three-dimensional scene as scene pixels.

4. The computer based method of claim 2, wherein the secondary image is a previously received image in a frame in the video stream, wherein the secondary image provides a perspective view of the three-dimensional scene different than the first perspective view.

5. The computer based method of claim 1 further comprising determining, for each of the secondary image pixels, whether a corresponding scene pixel exists at the three-dimensional location defined by the corresponding three-dimensional location data prior to incorporating the secondary image pixel into the three-dimensional scene, and incorporating secondary image pixels into the three-dimensional scene only if no corresponding scene pixel is already located in the scene.

6. The computer based method of claim 1, wherein the first image is further provided with a field of view and resolution of a source of the first image.

7. The computer based method of claim 6, wherein the three-dimensional location data for the first image pixels is depth buffer data, and wherein the three-dimensional location data is converted to a scene location based on the field of view of the source of the first image and the position in frame of the corresponding pixel.

8. The computer based method of claim 1, wherein the three-dimensional location data comprises depth with respect to a camera angle.

9. The computer based method of claim 8, wherein the three-dimensional location data for the first image pixels is extracted from a depth map of the first image.

10. The computer based method of claim 1, wherein the three-dimensional location data comprises an absolute location of the corresponding pixel located within the three-dimensional scene.

11. The computer based method of claim 10, wherein the three-dimensional location data is derived from a depth map for the first image.

12. The computer based method of claim 1, wherein the three-dimensional location data for the first image represents a three-dimensional location in the context of the first image, and wherein the three-dimensional location data for the secondary image represents a three-dimensional location in the context of the secondary image.

13. The computer based method of claim 12, further comprising for each secondary image pixel, determining if a pixel exists in the three-dimensional scene at a location corresponding to its three-dimensional location data and incorporating the secondary image pixel into the scene only if no such pixel is determined to exist.

14. The computer based method of claim 1 further comprising accepting input at the user interface device, and modifying the display view to a third perspective view different than the first or second perspective views, and preparing for display at the user interface device an updated display view of the three-dimensional scene.

15. The computer based method of claim 1, wherein evaluating whether the secondary image is to be replaced with the first image is based on a similarity coefficient comparing the existing secondary image to the first image.

16. The computer based method of claim 1, wherein the first image is evaluated to determine if it should be retained as a secondary image and wherein each secondary image of a plurality of secondary images is evaluated to determine whether it should be deleted.

17. The computer based method of claim 16, wherein the plurality of secondary images are ranked in terms of value based on a similarity coefficient, and wherein if the first image is determined to be more valuable than the least valuable secondary image, the least valuable secondary image is deleted and the first image is saved.

\* \* \* \* \*